(12) United States Patent
Nonaka

(10) Patent No.: US 6,315,073 B1
(45) Date of Patent: *Nov. 13, 2001

(54) 2WD-4WD CHANGEOVER CONTROL DEVICE

(75) Inventor: Noriaki Nonaka, Kariya (JP)

(73) Assignee: Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,375

(22) Filed: Aug. 26, 1999

(30) Foreign Application Priority Data

Aug. 26, 1998 (JP) .................................. 10/240749

(51) Int. Cl.⁷ .................................................... B60K 17/34
(52) U.S. Cl. .............................................. 180/247; 74/335
(58) Field of Search .................................... 180/247, 233; 74/335, 89.14, 473.12; 192/142 R

(56) References Cited

U.S. PATENT DOCUMENTS

| | | | |
|---|---|---|---|
| 4,664,217 | * | 5/1987 | Welch et al. .......................... 180/247 |
| 4,805,472 | * | 2/1989 | Aoki et al. ............................. 74/335 |
| 4,862,989 | * | 9/1989 | Kano et al. ........................... 180/247 |

FOREIGN PATENT DOCUMENTS

| | | |
|---|---|---|
| 63-87317 | 4/1988 | (JP) . |
| 64-85839 | 3/1989 | (JP) . |
| 7-179133 | 7/1995 | (JP) . |
| 9-79291 | 3/1997 | (JP) . |
| 9-303426 | 11/1997 | (JP) . |

\* cited by examiner

*Primary Examiner*—Kevin Hurley
(74) *Attorney, Agent, or Firm*—Burns, Doane, Swecker & Mathis, LLP

(57) ABSTRACT

A 2WD-4WD changeover control device for changing the driving system of a vehicle between a two wheel drive mode and a four wheel drive mode includes a housing and a switch for turning on and off an indicator which indicates whether the transfer is in a two wheel drive mode or a four wheel drive mode. The switch is constructed of electrodes and a conductive spring member which establishes and interrupts an electrical connection between the electrodes. The electrodes are fixed on the inner side of a wall of a housing portion that is formed of an electrically insulating material.

17 Claims, 4 Drawing Sheets

2WD-4WD CHANGEOVER CONTROL DEVICE

This application is based on and claims priority under 35 U.S.C. § 119 with respect to Japanese Application No. 10(1998)-240749 filed on Aug. 26, 1998, the entire content of which is incorporated herein by reference.

FIELD OF THE INVENTION

The present invention generally relates to a vehicle driving system. More particularly, the present invention pertains to a 2WD-4WD changeover control device for changing the driving system of a vehicle between a two wheel drive mode and a four wheel drive mode.

BACKGROUND OF THE INVENTION

A known 2WD-4WD changeover control device as illustrated in Japanese Patent Laid-Open Publication No. Sho. 64 (1998)-85839 or Japanese Patent Laid Open Publication No. Hei. 7 (1995)-179133 includes a housing having a wall, and a shaft rotatably supported to the wall of the housing and linked continually to a 2WD-4WD changeover member of a transfer and driving mechanism for driving the shaft via a spring.

Generally speaking, such a 2WD-4WD changeover control device is provided with an indicator indicating whether the transfer is in the two wheel drive mode or the four wheel drive mode, and a switch is used for controlling the indicator. The switch is a commercially available one and is operated by a cam on a shift fork shaft. However, the use of such a switch is not particularly desirable from the standpoint of reducing cost and production weight.

A need thus exists for a 2WD-4WD changeover control device that is less costly and lighter in weight.

SUMMARY OF THE INVENTION

In light of the foregoing, the 2WD-4WD changeover control of the present invention includes a housing having a wall, a shaft rotatably supported with respect to the wall of the housing and linked continually to the 2WD-4WD changeover member of a transfer mechanism, a driving device for driving the shaft via a spring, an indicator indicating whether the transfer mechanism is in the two wheel drive mode or the four wheel drive mode, and a switch for controlling the indicator. The switch includes a plurality of mutually insulated electrodes provided at one of the inner side of the wall of the housing and the shaft, and a conductive member establishing and interrupting an electric connection between any two of the electrodes depending on the angular position of the shaft.

According to another aspect of the invention, a 2WD-4WD changeover control device for changing the driving system of a vehicle between the two wheel drive mode and the four wheel drive mode includes a housing having a wall made of insulating material, a shaft rotatably supported with respect to the wall of the housing and continually operatively associated with a 2WD-4WD changeover member, a driving device for driving the shaft to switch between the two wheel drive mode and the four wheel drive mode, an indicator for indicating one of the two wheel drive mode and the four wheel drive mode, and a switch for controlling operation of the indicator. The switch includes a plurality of electrodes provided at the inner side of the wall of the housing and a conductive member establishing and interrupting an electric connection between electrodes depending on the angular position of the shaft.

According to the present invention, the switch and the housing share a common portion thus providing an improvement in cost reduction and lightweight manufacturing.

BRIEF DESCRIPTION OF THE DRAWING FIGURES

The above and other features and characteristics of the present invention will become more apparent from the following detailed description considered with reference to the accompanying drawing figures in which like elements are designated by like reference numerals and wherein.

DETAILED DESCRIPTION OF THE PRESENT INVENTION

Figure 1:
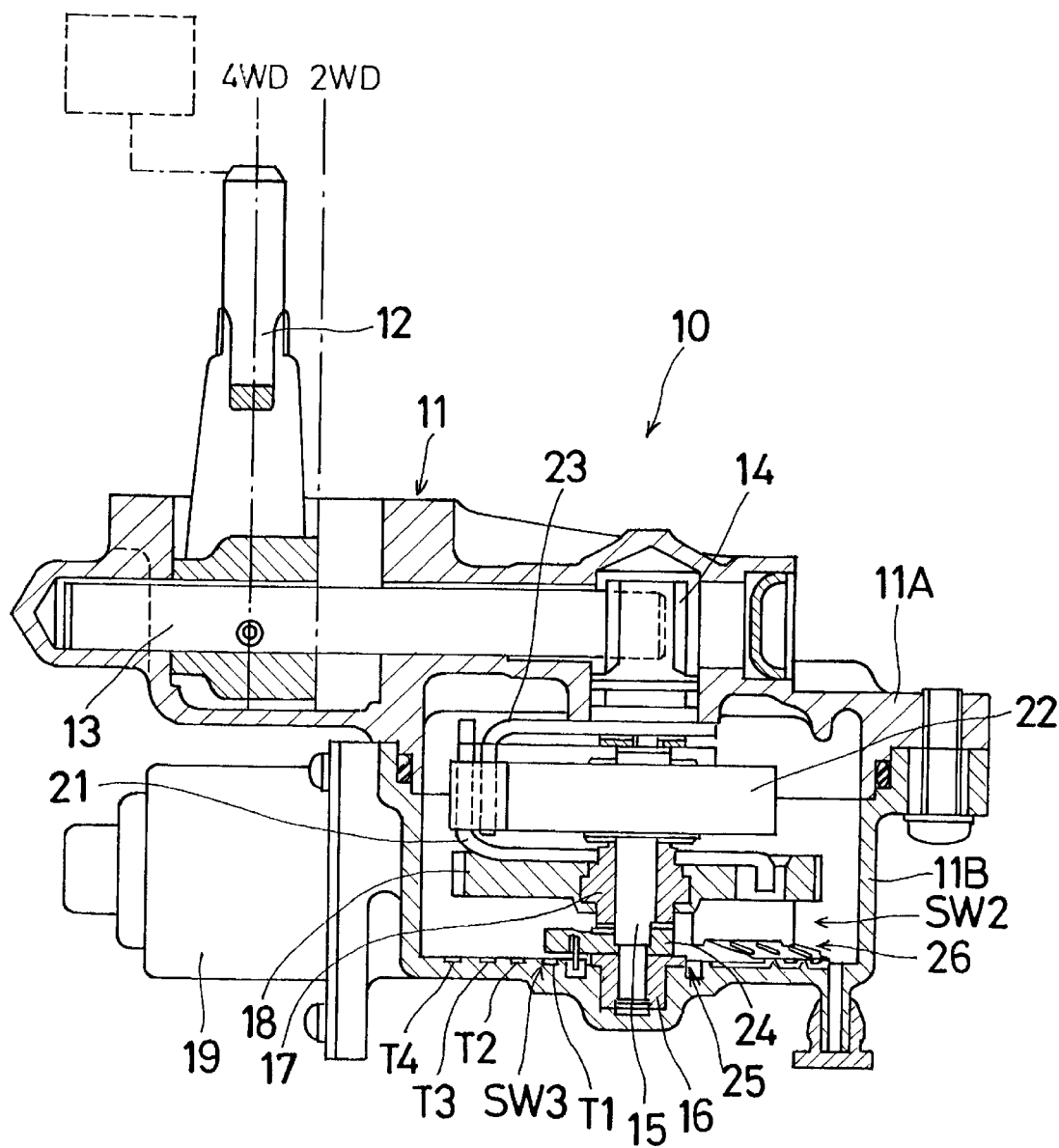
FIG. 1 is a cross-sectional view of an embodiment of a 2WD-4WD changeover control device in accordance with the present invention.

Referring initially to FIG. 1, the 2WD-4WD changeover control device 10 of the present invention for changing the driving system of a vehicle between a two wheel drive mode and a four wheel drive mode is comprised of a housing 11 which is divided into two portions, including a first housing portion 11A formed of metal and a second housing portion 11B formed of an insulating material such as a synthetic resin. The housing 11 is formed by connecting or otherwise integrating the first housing portion 11A and the second housing portion 11B.

Accommodated within the first housing portion 11A is a first shaft 13 on which is fixedly mounted a shift fork 12. The first shaft 13 is movable in a reciprocal manner within the first portion 11A. The shift fork 12 drives a member of a transfer device which serves to change the driving system of the vehicle between the two wheel drive mode and the four wheel drive mode. This member may be, for example, in the form of a movable clutch member of a positive clutch which engages and disengages a front wheel drive shaft with a rear wheel drive shaft when the vehicle is designed such that the front wheel shaft is driven in the two wheel drive mode.

A second shaft 15 is provided at its one end portion with a pinion 14 which is in meshing engagement with a rack (not specifically identified) formed on the first shaft 13. At a portion near the pinion 14, the second shaft 15 is rotatably supported in the first portion 11A of the housing 11. The other end portion of the second shaft 15 is also rotatably supported in the second portion 11B of the housing 11 via an insert-formed bush 16.

A metal-made bush 17 is rotatably mounted on the center portion of the second shaft 15 and an insert-formed resin-made worm-wheel 18 is secured on the metal-made bush 17. Thus, the worm-wheel 18 and the second shaft 15 are in a relative rotational relationship so that they can rotate relative to one another. The worm-wheel 18 is in meshing engagement with a worm 20 (shown in FIG. 2) which is driven by a DC motor 19 secured on the housing 11.

A lever 21 is arranged to rotate together with the worm-wheel 18 and is rotationally coupled with one end portion of a torsion spring 22 which is in the form of a spiral configuration. The other end portion of the torsion spring 22 is rotationally coupled with a lever 23 which rotates together with the shaft 15.

With the shift fork 12 located in the 4WD position as shown in FIG. 1, if the DC motor is turned on in a positive direction, the resulting rotation, after being reduced in speed, is transmitted to the lever 21. This causes rotation of the lever 21. Thus, the rotation of the motor shaft is transmitted via the worm 20 and the worm-wheel 18 to the second shaft 15 by way of the torsion spring 22 and the levers 21, 23. The resultant rotation of the second shaft 15 is converted, at the meshing engagement between the pinion 14 of the second shaft 15 and the first shaft 13, into axial movement of the first shaft 13. This causes a transfer of the shift fork 12 from the 4WD position to a 2WD position, thereby moving the movable clutch member of the positive clutch for establishing the two wheel drive mode of the driving system.

On the other hand, with the shift fork 12 at the 2WD potion, turning on the DC motor 19 in a negative direction establishes a transfer of the shift fork 12 to the 4WD position, thereby moving the movable clutch member of the positive clutch for establishing the four wheel drive mode of the driving system.

When it is desired to transfer the shift fork 12 from the 2WD position to the 4WD position or vice versa by driving the DC motor 19, such a transfer cannot be established if a large torque is generated between the movable member and its mating member or if both members are out of engagement with each other. However, even in such a case, due to the fact that the output torque of the DC motor 19 is sufficient to deform the spring 22, the transfer of the shift fork 12 can be established between the 2WD position and the 4WD position. That is to say, a driving path from the DC motor 19 to the lever 21 is moved to a set position by deforming the spring 22 and thereafter a consecutive driving path ranging from the lever 23 to the movable member is moved to or from the 4WD position by the accumulated force in the spring 22 immediately when the consecutive path takes a position at which the consecutive path is ready for being transferred to or from the 4WD position.

Figure 4:
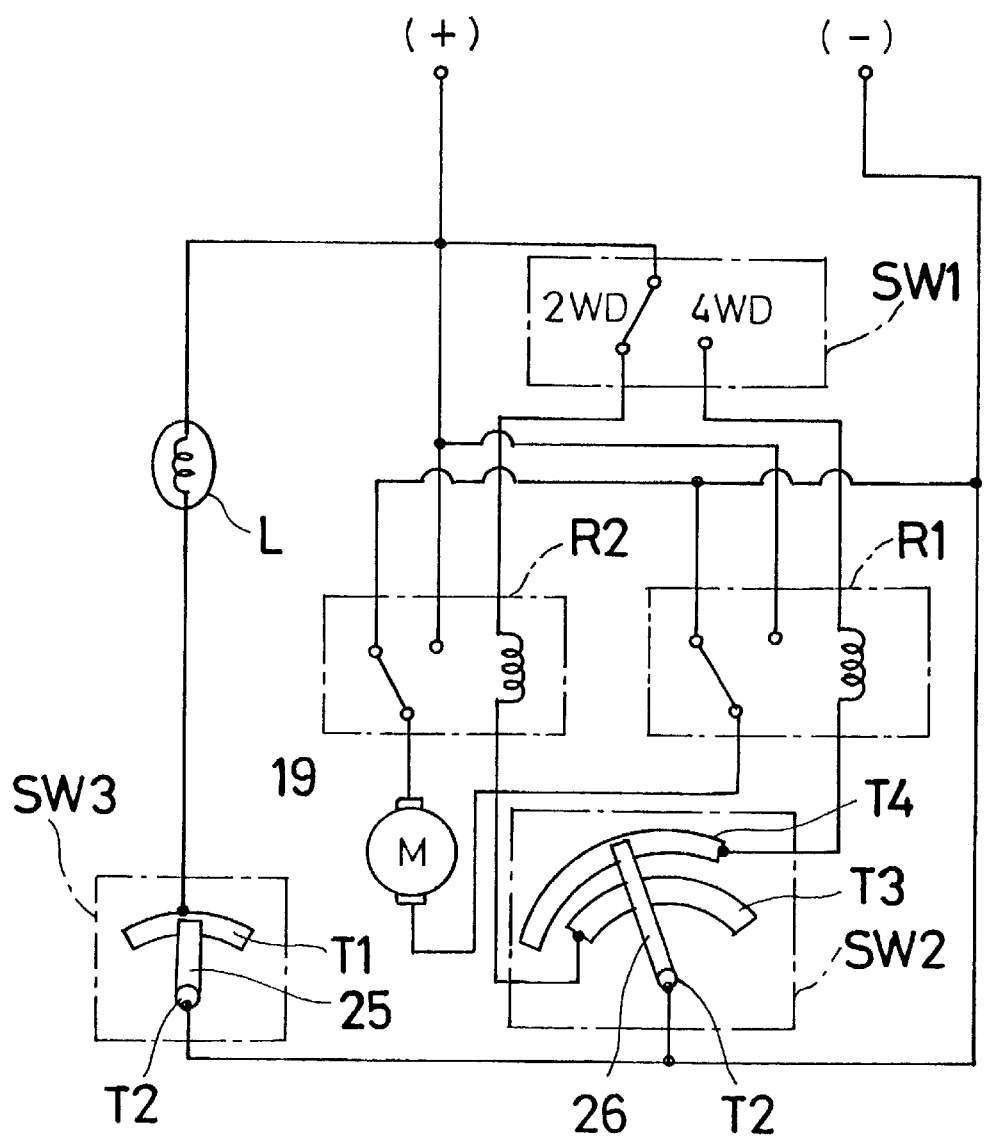
FIG. 4 is a circuitry diagram of the changeover control device shown in FIG. 1.

Two switches are provided to control the DC motor 19. A first switch SW1 for 2WD-4WD changeover which is operated by the driver and a second switch SW2 which is linked to the worm-wheel 18 in the housing 11. As shown in FIG. 4, one of the terminals of the DC motor 19 is selectively connected to a plus terminal (+) and a minus terminal (–) of a battery by way of a first relay R1, while the other terminal is selectively connected to the plus terminal (+) and the minus terminal (–) of the battery by way of a second relay R2. One end of each of the first relay R1 and the second relay R2 is electrically coupled with the plus terminal (+) of the battery via a first changeover switch SW1, while the other end of each of the first relay R1 and the second relay R2 is electrically coupled with the minus terminal (–) of the battery via a second changeover switch SW2.

The changeover switch SW2 connects a coil of the first relay R1 to the minus terminal (–) of the battery before the worm-wheel 18 assumes angular positions at which the shift fork 12 begins to travel for the 4WD position, while the changeover switch SW2 connects a coil of the second relay R2 to the minus terminal of the battery before the worm-wheel 18 takes angular positions at which the shift fork 12 begins to travel for the 2WD position. Before the shift fork 12 begins to travel from the 4WD position to the 2WD position and vice versa, the worm-wheel 18 is brought into rotation. This means that the travel range or distance of the worm-wheel 18 is set to be larger than the that of the shift fork 12 and the resultant difference is compensated for by the deformation of the spring 22.

As shown in FIG. 4, an indicator L which is adapted to indicate to the driver that the driving system of the vehicle is in the 4WD mode is operated by a third switch SW3 which is operationally coupled with the shaft 15 in the housing 11. More specifically, one end of the indicator L is connected to the plus terminal (+) of the battery, while the other end is connected via the third switch SW3 to the minus terminal (–) of the battery. The third switch SW3 establishes an electrical connection between the other end of the indicator and the minus terminal (–) of the battery only while the shaft 15 assumes angular positions prior to and after the engagement of the movable member with the mating member.

Figure 2:
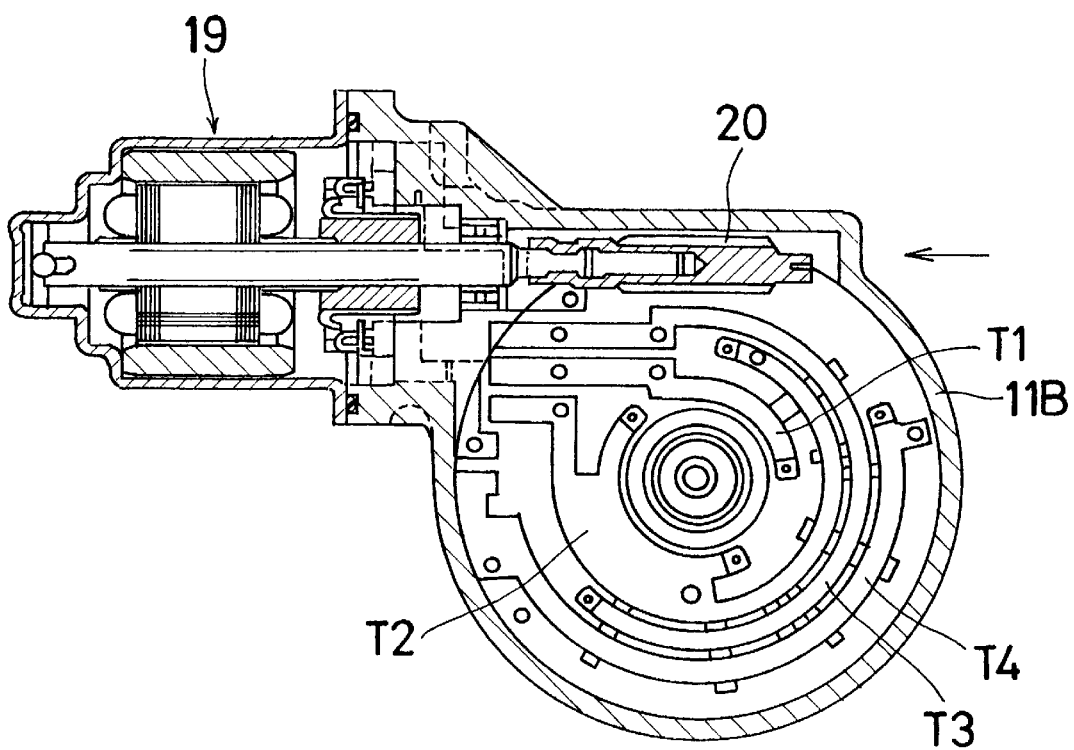
FIG. 2 is a cross-sectional view of a housing of the device shown in FIG. 1 as viewed from the worm-wheel side of the device.
Figure 3:
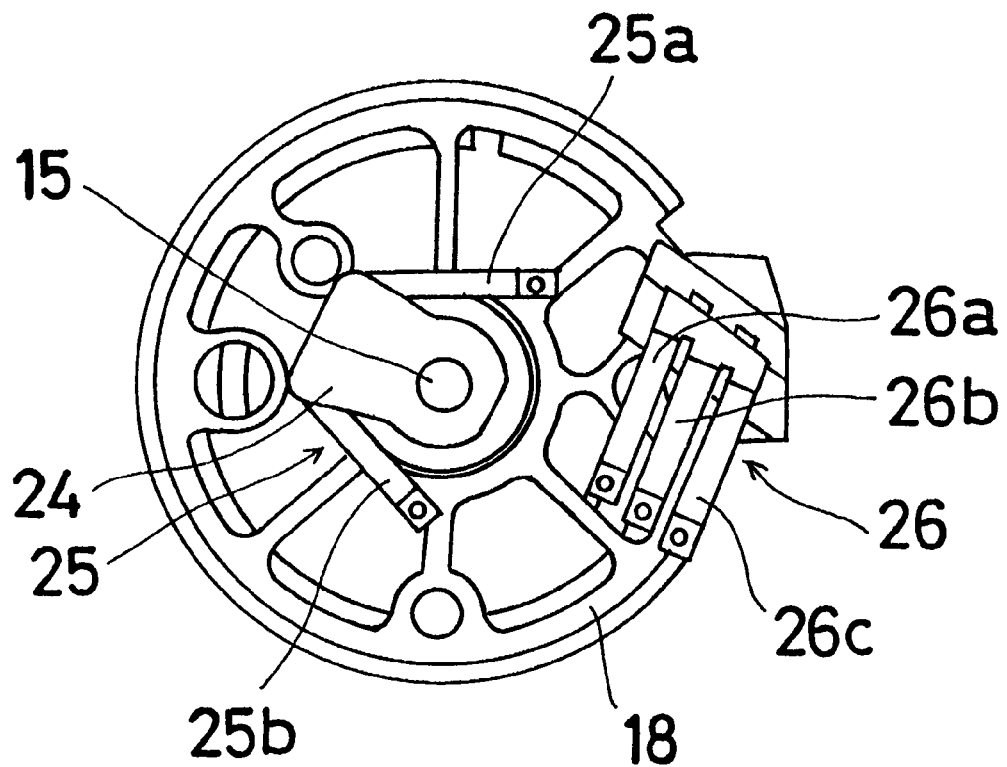
FIG. 3 is a plan view of the conductive springs used in the changeover control device of the present invention.

As shown in FIGS. 1–3, four arc-shaped band electrodes T1, T2, T3, T4 are provided on the inner surface or wall of the second resin-made portion 11B of the housing 11. The four arc-shaped band electrodes T1, T2, T3, T4 are arranged coaxially with respect to the shaft 15 and are radially spaced apart. The terminals T1, T2, T3, T4 are electrically connected to the indicator L, the minus terminal (–) of the battery, the coil of the second relay R1, and the coil of the first relay R2, respectively. An insulating relationship exists between the various electrodes T1 –T4 and is ensured by the resin-made portion 11B of the housing 11. Thus, electrodes are mutually and independently insulated. The provision of the electrodes T1 –T4 can be established by printing the electrodes on the wall or fixing the electrodes on the wall.

A holder 24 formed of an insulating material such as a synthetic resin is fixedly mounted on the second shaft 15 so as to be rotatable together with the second shaft. A first spring 25 formed of a conductive material is provided on the holder 24. The first spring 25 has a first tongue 25a and a second tongue 25b. The second tongue 25b is in continual sliding engagement with the electrode T2 such that a weak force or elasticity is applied from the second tongue 25b to the surface of the electrode T2. While the second shaft 15 takes positions corresponding to the range from prior to the engagement of the movable member with the mating member to the establishment of such engagement, the first tongue 25a is in sliding engagement with the electrode T1 such that a weak force or elasticity is applied from the first tongue 25a to the surface of the electrode T1. If the second shaft 15 is out of the foregoing positions, the first tongue 25a is in engagement with the resin-made portion 11B of the housing 11 with a slight elasticity.

The worm-wheel 18 is also provided with a spring 26 formed of a conductive material. This spring 26 (second spring) has a first elongated portion 26a, a second elongated portion 26b, and a third elongated portion 26c. The first elongated portion 26a of the second spring 26 is in continual contact with the electrode T2 with a slight elasticity. While the shaft 15 or the worm-wheel 18 takes positions corresponding to the range from prior to the travel of the shift fork 12 from the 2WD position to the 4WD position and the completion thereof, the second elongated portion 26b is in slight pressure contact with the electrode T3. However, while the shaft 15 or the worm-wheel 18 is out of the foregoing positions, the second elongated portion 26b is in slight pressure contact with the resin-made housing portion 11B.

While the shaft 15 or the worm-wheel 18 takes positions corresponding to the range from prior to the travel of the shift fork 12 from the 4WD position to the 2WD position and the completion thereof, the third elongated portion 26c of the spring 26 is in slight pressure contact with the electrode T4. However, while the shaft 15 or the worm-wheel 18 is out of the foregoing positions, the third elongated portion 26c of the spring 26 is in slight pressure contact with the resinmade housing portion 11B The electrode T1, the electrode T2, and the spring 24 constitute the switch SW3, while the electrode T2, the electrode T3, and the spring 26 constitutes the switch SW2.

As illustrated in FIG. 1, while the shift fork 12 is at the 4WD position, the switch SW3 establishes an electrical connection between the indicator L and the minus terminal (−) of the battery, thereby providing an indication that the driving system of the vehicle is in the 4WD mode to the driver. Due to the fact that the switch SW2 interrupts the electric connection between the coil of the first relay R1 and the minus terminal (−) of the battery and connects the coil of the second relay R2 thereto, upon the driver's manipulation of the switch SW1 from the 4WD side to the 2WD side, the coil of the second relay R2 is energized. This causes an electrical connection of the plus terminal (+) of the battery to the DC motor 19, thereby rotating the DC motor 19 in the positive direction. Thus, the worm-wheel 18 and the second shaft 15 are rotated, which causes movement of the shift fork 12 to the 2WD position. The driving operation of the DC motor 19 in the positive direction is continued until the shift fork 12 reaches the 2WD position. Immediately when the shift fork 12 reaches the 2WD position, the switch SW2 disconnects the coil of the relay R2 from the minus terminal (−) of the battery, thereby terminating the operation of the DC motor 19.

During movement of the shift fork 12 from the 4WD position to the 2WD position as mentioned above, the switch SW3 interrupts the electric connection between the minus terminal (−) of the battery and the indicator L, thereby inactivating the indicator 7.

While the shift fork 12 is at the 2WD position, the switch SW1 establishes an electrical connection between the coil of the first relay R1 and the minus terminal (−) of the battery. Thus, if the switch SW1 is moved from the 2WD side to the 4WD side, the coil of the first relay R1 is energized, thereby connecting the contact of the first relay R1 to the plus terminal (+) of the battery instead of the minus terminal (−) of the battery. Thus, the DC motor 19 is turned on in the negative direction. The operation of the DC motor 19 in the negative direction is continued until the shift fork 12 reaches the 4WD position. Immediately when the shift fork 12 reaches the 4WD position, the switch SW2 disconnects the coil of the relay R1 from the minus terminal (−) of the battery, thereby terminating the operation of the DC motor 19.

During the movement of the shift fork 12 from the 2WD position to the 4WD position as mentioned above, the switch SW3 establishes the electrical connection between the minus terminal (−) of the battery and the indicator L. Thus, the indicator 7 becomes active.

As described above, the switch SW3 which activates or deactivates the indicator L is constituted by the electrodes T1 and T2 which are provided on the inside surface of the wall of the resin-made housing portion 11B of the housing 11 and the conductive spring 25 which is rotated together with the shaft 15. This means that the housing 11 of the device 10 provides the housing of the switch SW3, and the electrical insulating relationship between the electrodes T1 and T2 can be ensured by the raw material forming the second housing portion 11B of the housing 11. This advantageously reduces the production cost of the switch SW3 in comparison with other known or commercially available switches designed to provide the same function.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A 2WD-4WD changeover control device for changing a driving system of a vehicle between a two wheel drive mode and a four wheel drive mode comprising:

a housing having a wall;

a shaft rotatably supported with respect to the wall of the housing and continually operatively associated with a 2WD-4WD changeover member of a transfer;

driving means for driving the shaft via a spring;

an indicator indicating to a driver of the vehicle whether the transfer is in the two wheel drive mode or the four wheel drive mode; and a switch switching the indication of the indicator, the switch including a plurality of mutually insulated electrodes provided at one of an inner side of the wall of the housing and the shaft and a conductive member establishing and interrupting an electric connection between any two of the electrodes depending on angular positions of the shaft.

2. The 2WD-4WD changeover control device as set forth in claim 1, wherein the electrodes are provided on the inner side of the wall which is formed of an electrically insulating material, and the conductive member is provided on a holder formed of an electrically insulating material and fixedly mounted on the shaft.

3. The 2WD-4WD changeover control device as set forth in claim 2, wherein the electrodes are conductive members which are arranged circumferentially with respect to the shaft.

4. The 2WD-4WD changeover control device as set forth in claim 2, wherein said switch is a first switch and the driving means includes a worm-wheel rotatably mounted on the shaft, a worm in meshing engagement with the worm-wheel, an electric motor for driving the worm, and a second switch for turning on and off the electric motor, said second switch including a plurality of mutually insulated electrodes provided on the inner side of the wall and a conductive member provided on the worm-wheel.

5. The 2WD-4WD changeover control device as set forth in claim 1, including a bush mounted on the shaft and a worm-wheel mounted on the bush, said worm-wheel being connected to the spring by a first lever.

6. The 2WD-4WD changeover control device as set forth in claim 5, including a second lever connected to the spring and the shaft.

7. The 2WD-4WD changeover control device as set forth in claim 6, wherein said switch is a first switch and said driving means includes a motor, and including a second switch for turning on and off the electric motor.

8. The 2WD-4WD changeover control device as set forth in claim 7, wherein said second switch includes a conductive spring provided with a plurality of spaced apart spring portions and a plurality of terminals provided on an inner side of the wall.

9. A 2WD-4WD changeover control device for changing a driving system of a vehicle between a two wheel drive mode and a four wheel drive mode comprising:

a housing having a wall made of insulating material;

a shaft rotatably supported with respect to the wall of the housing and continually operatively associated with a 2WD-4WD changeover member;

driving means for driving the shaft to switch between the two wheel drive mode and the four wheel drive mode;

an indicator indicating to a driver of the vehicle one of the two wheel drive mode and the four wheel drive mode; and a switch switching the indication of the indicator, the switch including a plurality of electrodes provided at an inner side of the wall of the housing and a conductive member establishing and interrupting an electric connection between electrodes depending on an angular position of the shaft.

10. The 2WD-4WD changeover control device as set forth in claim 9, including a bush mounted on the shaft, a worm-wheel mounted on the bush, and a first lever connected to the worm-wheel.

11. The 2WD-4WD changeover control device as set forth in claim 10, including a second lever connected to the shaft, said first and second levers being connected to a spring.

12. The 2WD-4WD changeover control device as set forth in claim 9, wherein said switch is a first switch and said driving means includes a motor, and including a second switch for turning on and off the electric motor.

13. The 2WD-4WD changeover control device as set forth in claim 12, wherein said second switch includes a conductive spring provided with a plurality of spaced apart spring portions and a plurality of terminals provided on an inner side of the wall.

14. The 2WD-4WD changeover control device as set forth in claim 9, wherein the conductive member is provided on a holder formed of an electrically insulating material and fixedly mounted on the shaft.

15. The 2WD-4WD changeover control device as set forth in claim 14, wherein the electrodes are conductive members which are arranged circumferentially with respect to the shaft.

16. The 2WD-4WD changeover control device as set forth in claim 9, wherein said switch is a first switch, said driving means including a worm-wheel rotatably mounted on the shaft, a worm in meshing engagement with the worm-wheel and an electric motor for driving the worm, and including a second switch for turning on and off the electric motor.

17. The 2WD-4WD changeover control device as set forth in claim 16, wherein said second switch includes a plurality of mutually insulated electrodes provided on the inner side of the wall and a conductive member provided on the worm-wheel.

* * * * *